US00RE46884E

(19) United States
(12) Reissued Patent
Tupala

(10) Patent Number: US RE46,884 E
(45) Date of Reissued Patent: May 29, 2018

(54) METHODS AND APPARATUS FOR SYNCHRONIZATION OF DATA FRAMES

(71) Applicant: Nokia Technologies Oy, Espoo (FI)

(72) Inventor: Miika Tupala, Turku (FI)

(73) Assignee: Nokia Technologies Oy, Espoo (FI)

(21) Appl. No.: 14/971,367

(22) Filed: Dec. 16, 2015

Related U.S. Patent Documents

Reissue of:
(64) Patent No.: 8,897,453
Issued: Nov. 25, 2014
Appl. No.: 13/392,625
PCT Filed: Aug. 10, 2010
PCT No.: PCT/IB2010/053604
§ 371 (c)(1),
(2) Date: Feb. 27, 2012
PCT Pub. No.: WO2011/024092
PCT Pub. Date: Mar. 3, 2011

U.S. Applications:
(60) Provisional application No. 61/236,604, filed on Aug. 25, 2009.

(51) Int. Cl.
*H04L 29/06* (2006.01)
*H04L 27/26* (2006.01)
*H04L 25/03* (2006.01)

(52) U.S. Cl.
CPC ..... *H04L 27/2613* (2013.01); *H04L 27/261* (2013.01); *H04L 27/2656* (2013.01);
(Continued)

(58) Field of Classification Search
CPC ..... H04L 27/261; H04L 27/2613; H04L 27/2656; H04L 27/2666; H04L 27/2676
(Continued)

(56) References Cited

U.S. PATENT DOCUMENTS 6,792,130 B1 * 9/2004 Jones ..... G06T 1/0085 375/E7.089
2009/0116374 A1 * 5/2009 Henriksson et al. ..... 370/203

FOREIGN PATENT DOCUMENTS

EP 2471230 B1 10/2015
WO 2008038979 4/2008
(Continued)

OTHER PUBLICATIONS

Feb. 7, 2018—(IN) Examination Report—App 1388/CHENP/2012.
Examiner's Report in PI 2012000796 dated Jun. 30, 2016, with Search Report.
Nortel networks, Yokohama, Japan "Synchronization Channel with cyclic hierarchical sequences and its low complexity detection" Apr. 1999, 19 pages.*
(Continued)

*Primary Examiner* — Matthew Heneghan
(74) *Attorney, Agent, or Firm* — Banner & Witcoff, Ltd.

(57) ABSTRACT

In accordance with an example embodiment of the present invention, a first bit sequence of a first length is assigned to a first group of signaling bits. Further, a second bit sequence of a second length is assigned to a second group of signaling bits. The first bit sequence is scrambled with a first scrambling sequence, and the second bit sequence is scrambled with a second scrambling sequence different from the first scrambling sequence. A first and a second orthogonal frequency-division multiplexing (OFDM) symbol are assigned to the first and the second scrambled bit sequences respectively, and the first and second orthogonal frequency-division multiplexing (OFDM) symbols are transmitted as synchronization symbols of a data frame. Further, a corresponding method for receiving the data frame, and apparatuses for transmission and reception are disclosed.

21 Claims, 8 Drawing Sheets

(52) U.S. Cl.
CPC ..... *H04L 27/2666* (2013.01); *H04L 27/2676* (2013.01); *H04L 25/03866* (2013.01); *H04L 27/2657* (2013.01)

(58) Field of Classification Search
USPC ..... 380/34, 221, 244, 255, 287; 370/203, 370/208, 210, 330
See application file for complete search history.

(56) References Cited

FOREIGN PATENT DOCUMENTS

| | | | |
|---|---|---|---|
| WO | 2009014354 | | 1/2009 |
| WO | 2009014356 | | 1/2009 |
| WO | WO 2009014354 | A1 * | 1/2009 |
| WO | 2008038979 | A3 | 7/2009 |

OTHER PUBLICATIONS

"Low-complex frame synchronization in OFDM systems" Beek et al; 5 pages, 1995.*

Supplementary European Search Report and Written Opinion received for corresponding European Application No. 10811346 dated Aug. 16, 2013, 7 pages.

International Search Report and Written Opinion received for corresponding Patent Cooperation Treaty Application No. PCT/IB2010/053604, dated Dec. 20, 2010, 12 pages.

International Preliminary Report on Patentability received for corresponding Patent Cooperation Treaty Application No. PCT/IB2010/053604, dated Feb. 28, 2012, 7 pages.

DVB Document, AI22rl, "Frame structure channel coding and modulation for a second generation digital terrestrial television broadcasting system (DVB-T2)" Jan. 2008, p. 107-108.

* cited by examiner

METHODS AND APPARATUS FOR SYNCHRONIZATION OF DATA FRAMES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

This application was originally filed as PCT Application No. PCT/IB2010/053604 filed Aug. 10, 2010, which claims priority benefit to United States Provisional Patent Application No. 61/236,604, filed Aug. 25, 2009.

TECHNICAL FIELD

The present application relates generally to synchronization of data frames, for example data frames of a broadcasting system.

BACKGROUND

Many transmission systems, for example broadcasting transmission systems, are built according to a public or proprietary standard. Thus, it can be made sure that transmitters and receivers of the transmission system may work together. However, standards evolve, and in order to secure that devices that are built according to a newer version of a standard may communicate with devices that are built according to an earlier version of the standard, the standard has to be designed backward compatible, and the devices have to be built accordingly. For example, after the introduction of color television (TV), black-and-white TV sets were still able to decode a color TV signal and display a black-and-white image.

Also digital TV standards evolve, for example standards of the digital video broadcasting (DVB) family of standards, such as digital video broadcasting satellite (DVB-S), digital video broadcasting cable (DVB-C), digital video broadcasting terrestrial (DVB-T), digital video broadcasting handheld (DVB-H), and/or the like. For example, DVB-T has evolved into second generation DVB-T2. Even though backward compatibility was not a goal for DVB-T2, compatibility requirements that DVB-T receivers do not get confused by a DVB-T2 signal.

Further, digital video broadcasting next generation handheld (DVB-NGH) is based in part on the DVB-T2 system. As with DVB-H, adaptations are made in order to provide for requirements of a battery powered receiver, for example a DVB-NGH receiver in a handheld device like a mobile computer, a mobile telephone, and/or the like. Again, a compatibility requirement is that a DVB-T2 receiver does not get confused by a DVB-NGH transmitter. For this purpose, a data field in a frame or packet may be defined to have only a limited number of possible values for use in DVB-T2. For example, a 4-bit field may have defined only the values "0000", "0001", and "0010" in DVB-T2. Other values (for example "0100") may be marked "for future use". These other values may then be used in a DVB-NGH system or any other system evolving from DVB-T2. A DVB-T2 receiver may ignore these other values.

SUMMARY

Various aspects of examples of the invention are set out in the claims.

According to a first aspect of the present invention, a first bit sequence of a first length is assigned to a first group of signaling bits. Further, a second bit sequence of a second length is assigned to a second group of signaling bits. The first bit sequence is scrambled with a first scrambling sequence, and the second bit sequence is scrambled with a second scrambling sequence different from the first scrambling sequence. A first and a second orthogonal frequency-division multiplexing (OFDM) symbol are assigned to the first and the second scrambled bit sequences, and the first and second orthogonal frequency-division multiplexing (OFDM) symbols are transmitted as synchronization symbols of a data frame.

According to a second aspect of the present invention, an orthogonal frequency-division multiplexing (OFDM) signal comprising a first and a second orthogonal frequency-division multiplexing (OFDM) symbol is received. The first and second orthogonal frequency division multiplexing (OFDM) symbols are used for synchronization of a data frame, wherein the first orthogonal frequency-division multiplexing (OFDM) symbol corresponds to a first scrambled bit sequence and the second orthogonal frequency-division multiplexing (OFDM) symbol corresponds to a second scrambled bit sequence. The first scrambled bit sequence is descrambled with a first scrambling sequence and the second scrambled bit sequence with a second scrambling sequence different from the first scrambling sequence. A first group of signaling bits is decoded from the first descrambled bit sequence and a second group of signaling bits is decoded from the second descrambled bit sequence.

According to a third aspect of the present invention, an apparatus is described comprising a processor configured to assign a first bit sequence of a first length to a first group of signaling bits, and to assign a second bit sequence of a second length to a second group of signaling bits. The processor is further configured to scramble the first bit sequence with a first scrambling sequence, and to scramble the second bit sequence with a second scrambling sequence different from the first scrambling sequence. The processor is also configured to assign a first and a second orthogonal frequency-division multiplexing (OFDM) symbol to the first and the second scrambled bit sequences, and to transmit the first and second orthogonal frequency-division multiplexing (OFDM) symbol as synchronization symbols of a data frame.

According to a fourth aspect of the present invention, an apparatus is described comprising a processor configured to receive an orthogonal frequency-division multiplexing (OFDM) signal comprising a first and a second orthogonal frequency-division multiplexing (OFDM) symbol. The processor is further configured to use the first and second orthogonal frequency division multiplexing (OFDM) symbol for synchronization of a data frame, wherein the first orthogonal frequency-division multiplexing (OFDM) symbol corresponds to a first scrambled bit sequence and the second orthogonal frequency-division multiplexing (OFDM) symbol corresponds to a second scrambled bit sequence. The processor is also configured to descramble the first scrambled bit sequence with a first scrambling sequence and the second scrambled bit sequence with a second scrambling sequence different from the first scrambling sequence. The processor is further configured to decode a first group of signaling bits from the first descrambled bit sequence and a second group of signaling bits from the second descrambled bit sequence.

The apparatuses may comprise at least one memory that contains executable instructions that if executed by the processor cause the apparatus to perform the above described functions.

According to a fifth aspect of the present invention, a computer program product comprising computer program code for use with a computer, a computer readable medium, and a computer program are disclosed for performing the above described functions.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 12 of the drawings.

Figure 1:
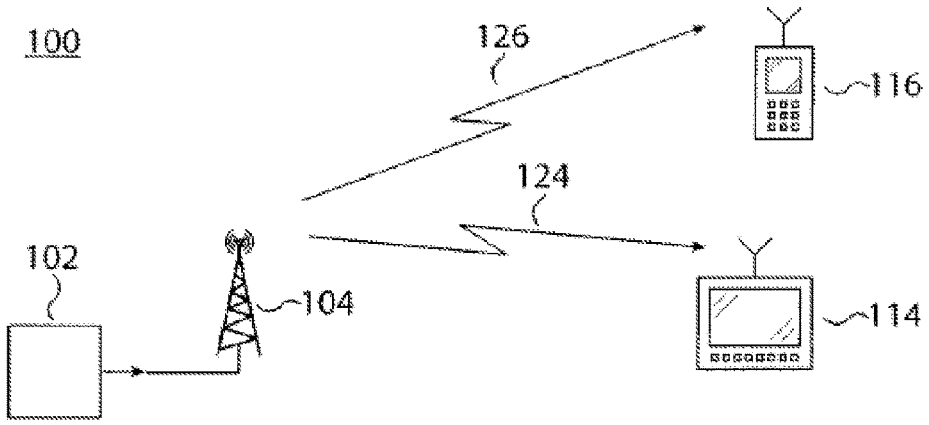
FIG. 1 shows a transmission system according to an example embodiment of the invention.

FIG. 1 shows a transmission system 100 according to an example embodiment of the invention. A service provider 102 provides a service for transmission, for example a media stream comprising audio data, video data, a TV program, a data file, and/or the like, for broadcasting by transmitter 104. Transmitter 104 may comprise electronics to assemble transmission packets, apply signal processing and modulation to the signals or transmission packets, provide a radio frequency (RF) signal for transmission, and/or the like. Transmitter 104 may also comprise an antenna for transmitting the RF signal. Transmitter 104 provides a broadcast transmission signal 124 for an apparatus comprising a stationary receiver 114, for example a TV set or a multimedia equipment in a home, through a broadcast transmission 124. The broadcast transmission signal 124 may be transmitted according to the DVB-T2 standard or any other standard for digital terrestrial transmission. Transmitter 104 may also provide a transmission signal 126 for an apparatus comprising a mobile receiver 116, for example a mobile TV set, a personal digital assistant (PDA) comprising a broadcasting receiver, a mobile phone comprising a broadcasting receiver, and/or the like. The transmission signal 126 for the mobile receiver 116 may be transmitted according to the DVB-NGH standard or any other standard suitable for mobile transmission.

The standard for terrestrial transmission and the standard for mobile transmission may have one or more commonalties in order to ease the transmitter and receiver design. Thus, transmitters and receivers may be built that are suitable for more than one standard without adding a high cost overhead.

Figure 2:
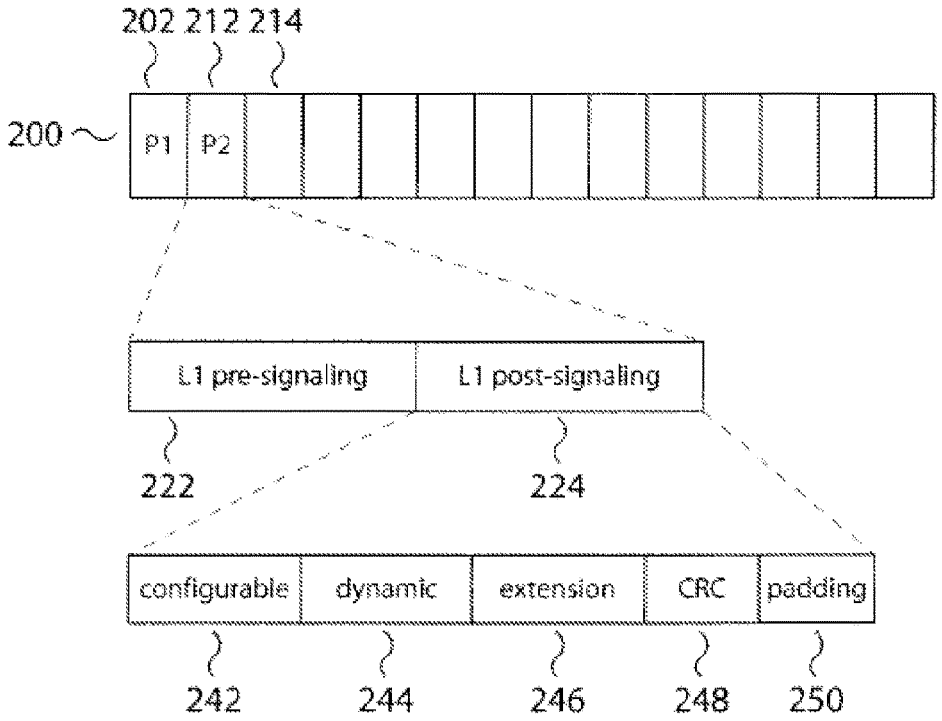
FIG. 2 shows an example embodiment of a data frame comprising synchronization and signaling information.

FIG. 2 shows an example embodiment of a data frame 200 comprising synchronization and signaling information, for example a data frame in accordance with a DVB system such as DVB-T2. Data frame or packet 200 may be part of a DVB-T2 transmission stream of frames or packets, for example a transmission stream carrying one or more services like media streams, video streams, audio streams, data files, and/or the like. DVB-T2 uses orthogonal frequency-division multiplexing (OFDM) for transmission. A DVB-T2 frame or packet starts with a preamble comprising a "P1" symbol 202 and one or more "P2" symbols 212.

The P1 symbol 202 has been designed with a number of properties that make it suitable for synchronizing the DVB-T2 frame at a receiver. Constraints for a DVB-T2 system may be that DVB-T2 reception is in many cases static and that a relatively large antenna may be used, for example a rooftop antenna. The P1 symbol 202 may also carry lower layer signaling information, for example an indication of a transmission type and basic transmission parameters of the data frame.

The P1 symbol 202 is followed by at least one P2 symbol 212. In the example embodiment of FIG. 2, the P1 symbol 202 is followed immediately by at least one P2 symbol 212. The P2 symbol 212 comprises additional lower layer signaling information. In an example embodiment, signaling information P2 may comprise parameters that may be used to access data carried in the data frame. In an example embodiment, signaling information of the at least one P2 symbol 212 comprises L1 pre-signaling information 222 and L1 post-signaling information 224. L1 pre-signaling information 222 enables the reception of the L1 post-signaling information 224 and may be used to enhance the efficiency of the coding. L1 post-signaling information 224 comprises parameters for accessing data carried in the data frame. In an example embodiment, L1 post-signaling information 224 comprises a configurable part 242 and a dynamic part 244. An optional extension field 246 may further follow the dynamic part 244. Further a Cyclic Redundancy Code (CRC) field 248 may be added. Unused parts of the P2 signaling information may be stuffed by padding 250.

Other data may be transmitted in frame 200 beginning at symbol 214, for example data of a service, for example a media stream comprising a TV program.

A transmission signal for a mobile apparatus, for example transmission signal 126 for mobile receiver 116 of FIG. 1, may also carry one or more services like media streams, video streams, audio streams, data files, and/or the like. The transmission signal for the mobile apparatus may also comprise P1 and P2 symbols as shown in FIG. 2.

Reception condition for a handheld device, for example a mobile receiver, may be more difficult because of a small antenna, bad reception conditions and/or the like, for example due to an indoor position of the antenna, varying reception conditions due to movement of the device, and/or the like. A mobile system for reception of a broadcasting signal may therefore have higher requirements with respect to the robustness of the broadcasting signal. Therefore, a requirement of the mobile system may be that the synchronization properties of the broadcasting signal are more robust.

Figure 3:
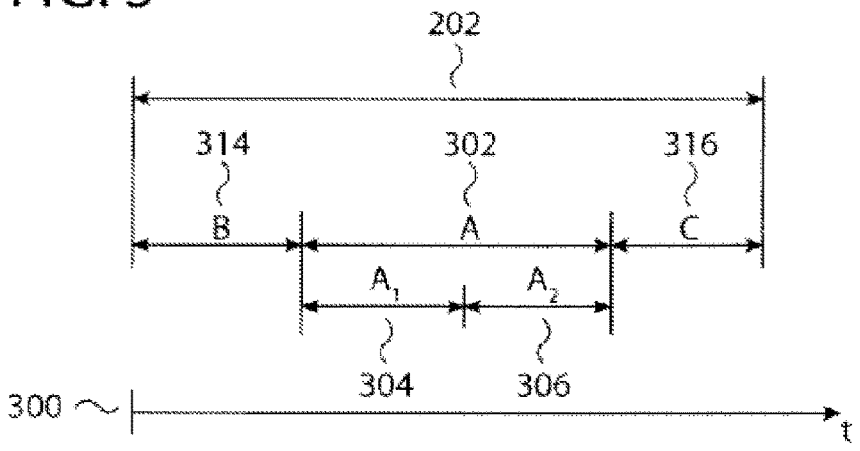
FIG. 3 shows an example embodiment of a time domain structure of a P1 symbol.

FIG. 3 shows an example embodiment of a time domain structure of a P1 symbol, for example P1 symbol 202 from FIG. 2, along a time axis 300. In the time domain, at least one part of the symbol may be repeated in order to provide correlation properties for synchronization. For example, a first part $A_1$ of a main part A may be repeated as part B before the main part A, and/or a second part $A_2$ may be repeated as part C after the main part A. In an example embodiment, the P1 symbol 202 in FIG. 3 comprises a main part A 302 that carries 1024 samples and extends over a time $T_A$=112 μs. Main part A 302 may be divided into a plurality of parts, for example, a part $A_1$ 304 of a time $T_{A1}$≈59 μs and a part $A_2$ 306 of a time $T_{A2}$≈53 μs. Further, the P1 symbol comprises a part B 314 of a time $T_B$≈59 μs and a part C 316 of a time $T_C$≈53 μs. Part B 314 carries a frequency shifted copy of the part $A_1$. Part C 316 carries a frequency shifted copy of the part $A_2$. Thus, correlation properties of parts $A_1$ and B and/or $A_2$ and C, respectively, may be used in a receiver of the signal carrying symbol P1 202 to achieve time synchronization. By decoding the content of the P1 symbol, a service discovery may be initiated.

Figure 4:
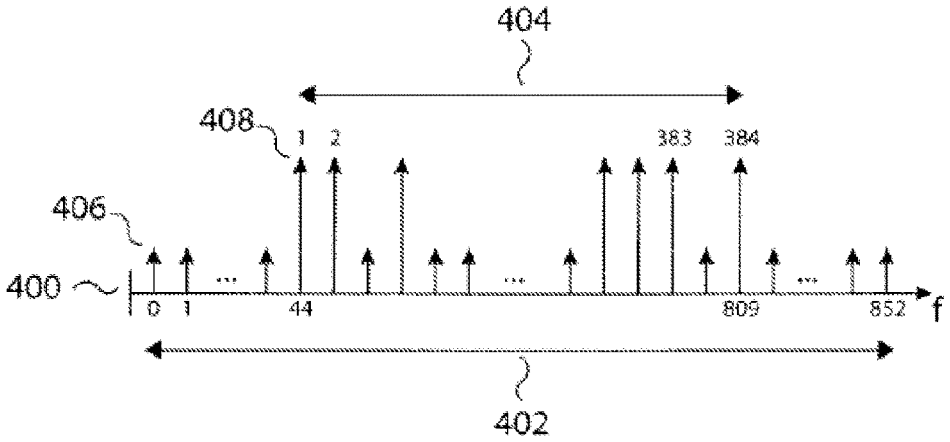
FIG. 4 shows an example embodiment of a frequency domain structure of a P1 symbol.

FIG. 4 shows an example embodiment of a frequency domain structure of a P1 symbol along a frequency axis 400. A pattern of active and inactive carriers may be used to provide synchronization and/or detection of a wanted signal, for example a DVB signal. Further, a sub-range may be used to provide further synchronization properties. In the example embodiment of FIG. 4, out of 853 carriers (numbered 0 . . . 852) of range 402 a number of 384 active carriers are used. Unused carriers are shown by short arrows 406, while active carriers are shown with long arrows 408. Active carriers may only span a sub-range 404 of all 853 carriers. In an example embodiment, a sub-range 404 of 6.83 MHz is used for active carriers (carriers 44-809), while the range 402 of the 853 carriers may span 7.61 MHz. The active carriers may be randomly or pseudo-randomly distributed in the sub-range. The random or pseudo-random distribution may be used by a receiver to achieve frequency synchronization and/or to detect the position of the P1 symbol in the transmission stream.

In an example embodiment, for example in a DVB-T2 system, the P1 symbol may carry a group of 7 bits, for example bits carrying signaling information. The group of 7 signaling bits may be split into a first field S1 comprising 3 signaling bits and a second field S2 comprising 4 signaling bits. According to an embodiment of the invention the S1 field may have the values shown in Table 1:

TABLE 1

| S1 field | | |
|---|---|---|
| S1 | Preamble Format/ P2 Type | Description |
| 000 | T2_SISO | T2 preamble: The P2 part is transmitted in SISO format |
| 001 | T2_MISO | T2 preamble: The P2 part is transmitted in MISO format |

TABLE 1-continued

| S1 field | | |
|---|---|---|
| S1 | Preamble Format/ P2 Type | Description |
| 010 | NGH_SISO | NGH preamble: The P2 part is transmitted in SISO format |
| 011 | NGH_MISO | NGH preamble: The P2 part is transmitted in MISO format |
| 100 | reserved | These combination may be used for future systems |
| 101 | reserved | |
| 110 | reserved | |
| 111 | reserved | |

The values "000" and "001" are defined for the DVB-T2 system. A value "000" of the S1 signaling bits indicates a single input-single output (SISO) system with one transmitting and one receiving antenna. A value "001" indicates a multiple input-single output (MISO) system with multiple transmitting antennas and one receiving antenna.

The values "010" and "011" may be defined for a next generation handheld (NGH) system. A value "010" of the S1 signaling bits may indicate a SISO system, a value "011" may indicate a MISO system. Values "100"-"111" may be reserved for future use. Similarly, one or more of these fields may be used to indicate a multiple input-multiple output (MIMO) system.

By using values "000" and "001" for the T2_SISO and T2_MISO systems, respectively, as in the DVB-T2 system, backward compatibility with the DVB-T2 system may be achieved. A DVB-T2 receiver may decode the values "000" or "001" in the field and therefore received the remainder of the frame or packet. However, if a DVB-T2 receiver decodes the values "010" or "011" of the S1 signaling bits, it will not receive and/or decode the remainder of the frame or packet, as the DVB-T2 receiver may not be capable of decoding the frame or packet correctly. The DVB-T2 receiver may therefore ignore the complete frame or packet.

A DVB-NGH receiver may decode the values "010" or "011" and therefore receive the whole frame or packet.

The S2 field may or may not be altered from the DVB-T2 standard. The DVB-T2 standard defines the fast fourier transformation (FFT) size as shown in TABLE 2 and defines whether preambles in the transmission are of the same type (value "XXX0") or whether different types of preambles are used (value "XXX1"): TABLE 3.

TABLE 2

| S2 field (DVB-T2, S1 = 00X) | | | |
|---|---|---|---|
| S1 | S2 | FFT size | Description |
| 00X | 000X | FFT size: 2K | Indicates the FFT size of the symbol in the T2 frame |
| 00X | 001X | FFT size: 8K | |
| 00X | 010X | FFT size: 4K | |
| 00X | 011X | FFT size: 1K | |
| 00X | 100X | FFT size: 16K | |
| 00X | 101X | FFT size: 32K | |
| 00X | 110X | reserved | These combination may be used for future systems |
| 00X | 111X | reserved | |

TABLE 3

| S2 field ("mixed"-bit) | | | |
|---|---|---|---|
| S1 | S2 | Meaning | Description |
| XXX | XXX0 | Not mixed | All preambles in the current transmission are of the same type as this preamble |
| XXX | XXX1 | Mixed | Preambles of different types are transmitted including at least one T2 preamble (S1 field = 00X) in every super-frame |

Transmission parameters, for example modulation of the P1 symbol, transmission frequency, and/or the like may be identical for a DVB-NGH transmission and a DVB-T2 transmission. Thus, a receiver may already decode from the S1 field whether the frame or packet is part of a DVB-T2 transmission or part of a DVB-NGH transmission. Therefore, in a DVB-NGH system, the S2 field may be used for signaling as described for the DVB-T2 system, or different signaling may be carried by the 4 signaling bits of the S2 field.

In an example embodiment, a bit sequence is assigned to the group of signaling bits, for example a bit sequence of a length corresponding to the number of active carriers used for the transmission of the P1 symbol. The bit sequence may have 384 bits in correspondence with the frequency domain structure of the P1 symbol shown in FIG. 4.

The bit sequence may be a concatenated bit sequence. For example, 8 different bit sequence values may be used for a first partial bit sequence $SEQ_{S1}$ for the different values of the 3 signaling bits of the S1 field, and 16 different bit sequence values may be used for a second partial bit sequence $SEQ_{S2}$ for the 4 signaling bits of the S2 field. The first partial bit sequence $SEQ_{S1}$ may have a length of 64 bits, and the second partial bit sequence $SEQ_{S2}$ may have a length of 256 bits. The concatenated bit sequence may concatenate the first and second partial bit sequence in the order $SEQ_{S1}$-$SEQ_{S2}$-$SEQ_{S1}$. Thus, a total sequence length of 384 bits is achieved (256 bits+2*64 bits).

The bit sequence may be scrambled by a scrambling sequence of the same length. In an example embodiment, scrambling is performed by an XOR-function or by any other suitable function for reducing a peak-to-average power ratio (PAPR) of the signal.

In an example embodiment, the scrambling sequence is generated by a pseudo-random generator, for example a pseudo-random binary sequence (PRBS) generator. The PRBS generator may be related to a polynomial of degree n ($1+a_1*x+a_2*x^2+\ldots a_{n-1}*x^{n-1}+x^n$; $a_1, a_2 \ldots a_{n-1} \in [0; 1]$), for example a polynomial $1+x^{14}+x^{15}$. Using a primitive polynomial may provide a maximum length pseudo-random binary sequence. The repetition length of the pseudo-random binary sequence may be calculated from the degree n of the primitive polynomial as $2^n-1$. In the case for the primitive polynomial $1+x^{14}+x^{15}$ the repetition length of the pseudo-random binary sequence is 32767. Thus, after 32767 bits, the pseudo-random binary sequence repeats itself. In an example embodiment, the scrambling sequence for scrambling the bit sequence is a contiguous part of the pseudo-random binary sequence, for example a contiguous part of 384 bits for scrambling a bit sequence of a length of 384 bits.

In an example embodiment, an orthogonal frequency-division multiplexing (OFDM) symbol is assigned to the scrambled bit sequence. The OFDM symbol may use active carriers as described in relation to FIG. 4 and may have a time-domain structure as shown in FIG. 3. The OFDM symbol is then transmitted as a synchronization symbol to a receiver, for example from transmitter 104 to receiver 114 or receiver 116 of FIG. 1. The synchronization symbol may be part of a data frame, a data packet, a data burst and/or the like.

Figure 5:
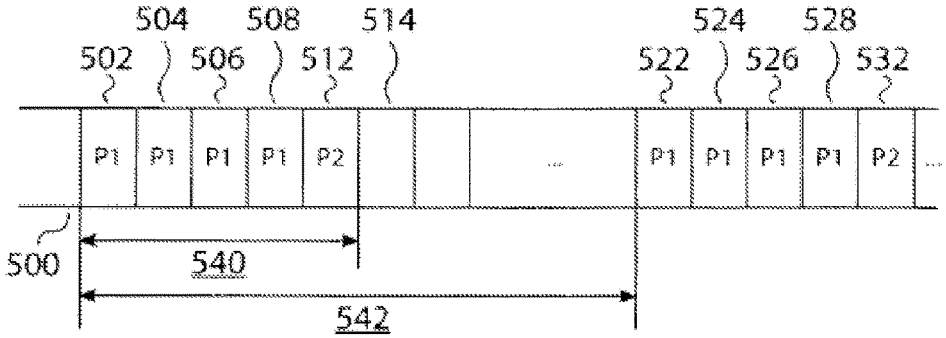
FIG. 5 shows an example embodiment of a data frame having multiple P1 symbols and one or more P2 symbols.

FIG. 5 shows an example embodiment of a data frame having multiple P1 symbols and one or more P2 symbols. A data frame 542 may comprise a preamble 540 and a part comprising user data starting at symbol 514. The preamble comprises at least a first P1 symbol 502 and a second P1 symbol 504 and one or more P2 symbols 512. In an example embodiment, the preamble may comprise further P1 symbols following the second P1 symbol 504, for example a third P1 symbol 506 and a fourth P1 symbol 508.

The first P1 symbol 502 may correspond to a first group of signaling bits. The first group of signaling bits may comprise an S1 field and an S2 field as described in TABLES 1 to 3.

The first P1 symbol 502 is followed by a second P1 symbol 504. The second P1 symbol 504 may correspond to a second group of signaling bits. In an example embodiment, the second group of signaling bits is a copy or a repetition of the first group of signaling bits comprising the S1 and S2 fields.

The first and second group of signaling bits may be assigned a first and second bit sequence. In an example embodiment, the first group of signaling bits is assigned a first bit sequence of a first length, and the second group of signaling bits is assigned a second bit sequence of a second length. The first and second group of signaling bits may comprise 7 signaling bits each, and the first and second bit sequence may have a length of 384 bits each. In an example embodiment, the first and second group of signaling bits are identical. Thus, also the first and second bit sequences may be identical.

In an example embodiment, the first and second bit sequences are scrambled with different scrambling sequences. The first bit sequence may be scrambled with a first scrambling sequence, for example of 384 bits length, and the second bit sequence may be scrambled with a second scrambling sequence of 384 bits length. In an example embodiment, the first and second scrambling sequences may be parts of a pseudo-random binary sequence (PRBS) with a repetition length that is longer than each scrambling sequence. For example, the first scrambling sequence may be a first part of a PRBS of length 32767 bits, and the second scrambling sequence may be a second part of the same PRBS. The second part of the PRBS may be a part directly following the first part of the PRBS. Thus, a continuous output of a PRBS generator may be used to scramble the first and second bit sequences.

A first and second OFDM symbol is assigned to the first and second scrambled bit sequences, respectively. The first and second OFDM symbol may use the same set of 384 active carriers as described in relation to FIG. 4. By using different scrambling sequences for the first and second bit sequence, the first and second OFDM symbols may be different.

Having more than one OFDM symbol for synchronization may improve the synchronization properties of the transmission frame or packet. Using different OFDM symbols may make the preamble of the frame or packet more robust to inter-symbol interference, for example in single-frequency networks with multipath propagation.

Using the a first group of signaling bits as described in relation to TABLES 1 to 3, and further assigning a bit sequence and a scrambling sequence to the first group of signaling bits as in the DVB-T2 system may provide backward compatibility for a DVB-T2 receiver. A DVB-T2 receiver may be capable of decoding the first P1 symbol. It may find that it is capable of decoding the frame or packet (S1="000" or "001"), or it may discard the remainder of the frame or packet (S1="010" or "011" or any other value).

A DVB-NGH receiver may also decode the first symbol. When it decodes the S1 field, it may find that the content of the S1 field is "010" or "011". It may then conclude that the next symbol is a second P1 symbol that may be used for signaling. It may further conclude that a second scrambling sequence different from the first scrambling sequence is required for decoding the second P1 symbol, for example a continuation of the first scrambling sequence used for the first P1 symbol.

In an example embodiment, the second group of signaling bits may be different from the first group of signaling bits. Thus, more information may be carried in the first and second P1 symbols. For example, the second group of signaling bits may carry signaling information of one or more DVB-T2 P2 symbols. Thus, information is shifted from P2 symbols of the DVB-T2 system to P1 symbols in the DVB-NGH system. In an alternative embodiment, the second group of signaling bits comprises information different from the information carried in the P2 symbols of the DVB-T2 system.

In an example embodiment, the second P1 symbol 504 is followed by one or more further P1 symbols, for example by a third P1 symbol 506. A fourth P1 symbol 508 may follow the third P1 symbol. The third P1 symbol 506 and the fourth P1 symbol 508 may carry a third and a fourth group of signaling bits, respectively. The third and fourth group of signaling bits may be identical to the first group of signaling bits carrying the S1 and S2 fields. In an alternative embodiment, the third and fourth group of signaling bits may carry information different from the first and/or second group of signaling bits. For example, the third and fourth group of signaling bits may carry signaling information of one or more DVB-T2 P2 symbols, or they may carry different information.

A third bit sequence of a third length may be assigned to the third group of signaling bits, and a fourth bit sequence of a fourth length may be assigned to the fourth group of signaling bits. In an example embodiment, the third and fourth group of signaling bits comprise 7 signaling bits each, and the third and fourth bit sequence may have a length of 384 bits each.

In an example embodiment, the third and fourth bit sequences are scrambled with different scrambling sequences. The third bit sequence may be scrambled with a third scrambling sequence, for example of 384 bits length, and the fourth bit sequence may be scrambled with a fourth scrambling sequence of 384 bits length. In an example embodiment, the third and fourth scrambling sequences may be parts of a pseudo-random binary sequence (PRBS) with a repetition length that is longer than each of the first, second, third and fourth scrambling sequences. For example, the third scrambling sequence may be a third part of a PRBS of length 32767 bits, and the fourth scrambling sequence may be a fourth part of the same PRBS. The third part of the PRBS may be a part directly following the second part of the PRBS, and the fourth part of the PRBS may be a part directly following the third part of the PRBS. Thus, a continuous output of a PRBS generator may be used to scramble the first to fourth bit sequences.

A third and fourth OFDM symbol is assigned to the third and fourth scrambled bit sequences, respectively. The third and fourth OFDM symbol may use the same set of 384 active carriers as described in relation to FIG. 4. By using different scrambling sequences for the third and fourth bit sequence, the third and fourth OFDM symbols may be different.

Having more than one OFDM symbol for synchronization may improve the synchronization properties of the transmission frame or packet. Using different OFDM symbols may make the preamble of the frame or packet more robust to inter-symbol interference.

The lengths of the second, third and fourth bit sequences may be different from the length of the first bit sequence and from each other. The second, third and fourth scrambling sequences may have the same lengths as the second, third and fourth bit sequences, respectively. The first to fourth scrambling sequences may be parts of a pseudo-random binary sequence (PRBS) with a repetition length that is longer than each of the first, second, third and fourth scrambling sequences. In an example embodiment, the first to fourth scrambling sequences are continuous parts of a PRBS based on the primitive polynomial $1+x^{14}+x^{15}$.

Each scrambled bit sequence is assigned an OFDM symbol. The lengths of the first to fourth scrambled bit sequences may correspond to the number of active carriers of the first to fourth OFDM symbol, respectively, for example the carriers of an OFDM symbol shown in FIG. 4. Thus, there is a direct mapping of each bit of the bit sequence to an active carrier of the respective OFDM symbol. For example, a scrambled bit sequence of 200 bits may be assigned to 200 active carriers out of the 853 carriers of the OFDM symbol, or a bit sequence of 680 bits may assigned to 680 active carriers out of the 853 carriers of the OFDM symbol. In another example embodiment, higher order modulation may be applied on each carrier, and thus multiple bits may be assigned on each carrier.

By using different carriers for each P1 symbol, the synchronization properties may be adapted, for example according to present or future receiver capabilities, transmission channel conditions, and/or the like.

In an example embodiment, the first to fourth group of signaling bits comprise 7 signaling bits each. Thus, a total number of 28 signaling bits may be transmitted in the 4 P1 symbols 502, 504, 506 and 508. The signaling bits may be used to announce parameters of the next and/or higher level signaling, for example of the L1 pre-signaling 222, which is so far transmitted in the one or more P2 symbols 212 of FIG. 2. Parameters transmitted in the P1 symbols may include an FFT size, a guard interval length, a pilot pattern, a frame length, and/or the like.

Figure 6:
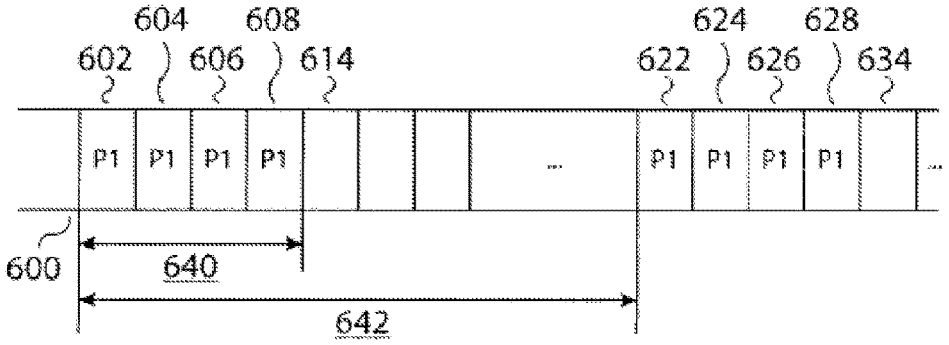
FIG. 6 shows an example embodiment of a data frame having multiple P1 symbols and no P2 symbol.

FIG. 6 shows an example embodiment of a data frame having multiple P1 symbols and no P2 symbol. Frame or packet 642 comprises a preamble 640 comprising four P1 symbols 602, 604, 606 and 608. The frame or packet 642 also comprises a data part beginning at symbol 614. After the end of frame or packet 642, another frame or packet is transmitted beginning with P1 symbols 622, 624, 626 and 628 followed by a data part starting at symbol 634.

Signaling data that is defined by the DVB-T2 standard to be transmitted in one or more P2 symbols may be transmitted at least in part in the multiple P1 symbols 602, 604, 606 and 608 and 622, 624, 626 and 628. Parts of the signaling data of the one or more P2 symbol may also be transmitted in the data part beginning at symbols 614 and 634, or distributed over the data frame. Thus, a P2 symbol may not be needed.

Figure 7:
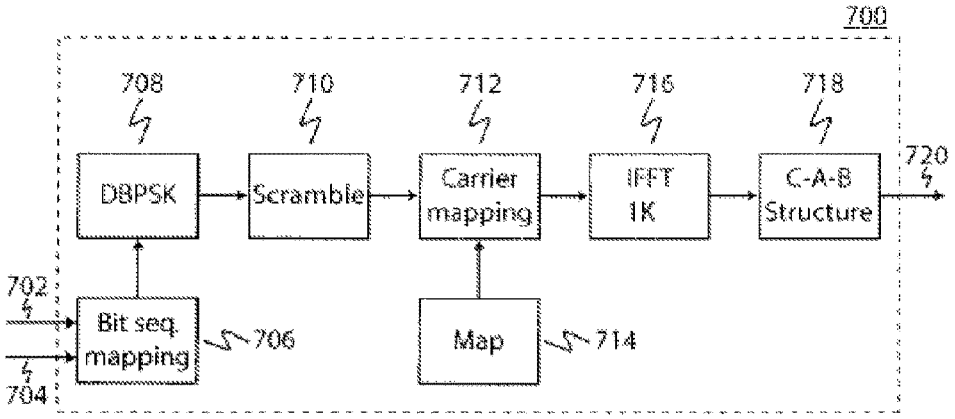
FIG. 7 shows an example embodiment of functional blocks of a P1 symbol generator.

FIG. 7 shows an example embodiment of functional blocks of a P1 symbol generator 700. Signaling bits, for example 51 and S2 signaling bits, and/or other signaling bits like L1 pre- and post-signaling bits, are received at inputs 702 and 704 and directed to a bit sequence mapping a bit sequence mapping 706. For example, 7 signaling bits are received at the bit sequence mapping 706 and mapped to a bit sequence, for example of a length of 384 bit. In an example embodiment, the bit sequence is mapped to a digital binary phase shift keying (DBPSK) at a DBPSK mapping block 708. For example, a sequence generated by DBPSK mapping block 708 may start with a value "+1", which is not assigned to any carrier later. For a bit input of "0", the last value of the DBPSK is repeated. For a bit input of "1", the last value of the DBPSK is inverted. Thus, if the previous value was "+1", the next value is "+1" for an input "0", and the next value is "−1" for an input "1". The relation is shown in TABLE 4:

TABLE 4

| DBPSK mapping | | | |
|---|---|---|---|
| Previous value | Input | Next value | Comment |
| +1 | 0 | +1 | Repeat previous value |
| −1 | 0 | −1 | Repeat previous value |
| +1 | 1 | −1 | Invert previous value |
| −1 | 1 | +1 | Invert previous value |

At a scrambler block 710, the sequence is scrambled with a scrambling sequence. In an example embodiment, the scrambling sequence may comprise values "+1" and "−1". The scrambling sequence may be generated by a PRBS generator. A "0"-value of the output of the PRBS generator is mapped to "+1", a "1"-value is mapped to "−1". The scrambler block 710 then multiplies a bit of the input sequence with a bit of the scrambling sequence.

At a carrier mappint 712, the scrambled bit sequence is mapped to carriers of an OFDM symbol. A carrier map 714 is provided. The OFDM symbol is then inverse fourier transformed at an inverse-fast-fourier transform (IFFT) block 716 to generate a time representation of the symbol. The fourier block size may be 1024 (1K). At a C-A-B structure block 718, parts A1 and A2 of the symbol are repeated as parts B and C to generate a C-A-B structure, as described in relation to FIG. 3. The P1 symbol is provided at an output 720 for modulation in the assigned frequency band.

For a first group of signaling bits, the PRBS generator of scrambler block 710 is initialized with a fixed value, for example the value "100111001000110". After generation of a scrambling sequence of a length corresponding to a first length of a first bit sequence, the PRBS generator may be stopped. The repetition length of the scrambling sequence may be longer than the first length. In an example embodiment, the repetition length may be 32767 bits, and the first length may be 384 bits. In an alternative example embodiment, the repetition length may be 65535 bits, and the first length may be 192 bits.

For a second group of signaling bits, the PRBS generator of scrambler block 710 is started again. However, it may not be initialized. Thus, the last value stored in the PRBS generator will be the start value of the next scrambling sequence. The second scrambling sequence for the second bit sequence may therefore be a continuation of the first scrambling sequence. Likewise, a third and fourth scrambling sequence may be generated by stopping and re-starting the PRBS generator without initialization. The third and fourth scrambling sequences may be used to scramble a third and a fourth bit sequence corresponding to a third and fourth group of signaling bits.

In another example embodiment, the PRBS generator of scrambler block 710 is initialized again for generation of a second P1 symbol. However, the initialization value may be different than the initialization value for the first scrambling sequence. In an example embodiment, an initialization value "010010000001111" may be used. Further different initialization values may be used for the generation of a third and fourth P1 symbol.

In a further example embodiment, different PRBS generators may be used for generating a first and a second scrambling sequence.

In an example embodiment, the PRBS is read from a memory. Thus, a PRBS generator may not be needed. Different sequences may be taken from the PRBS. For example a first sequence may be taken from the PRBS for a first scrambling sequence, a second sequence from the PRBS may be used as a second scrambling sequence, and so on. Sequences taken from the PRBS may be overlapping. However, non-overlapping PRBS sequences may provide better correlation and/or synchronization properties.

Figure 8:
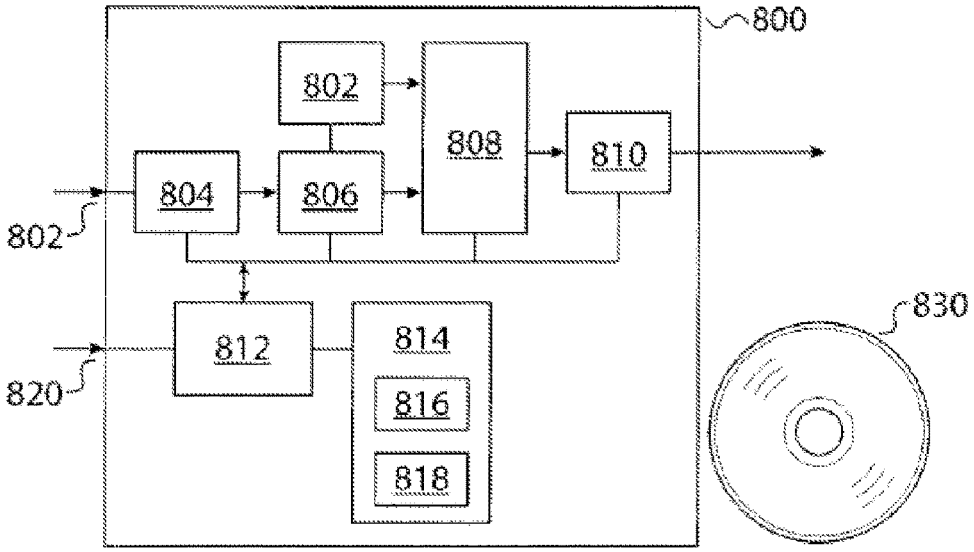
FIG. 8 shows an example embodiment of an apparatus configured to transmit frames or packets of a data stream.

FIG. 8 shows an example embodiment of an apparatus 800 configured to transmit frames or packets of a data stream, for example transmitter 104 receiving a media stream at port 801, for example from service provider 102 of FIG. 1. Coder 804 codes the media stream and produces transmission packets. P1 signaling information is generated at symbol generator 802. Symbol generator 802 may comprise the functional blocks of P1 symbol generator 700 as described in relation to FIG. 7. Signaling information may be provided through a bus system from controller/processor 812. Signaling information may be stored in memory 814, for example in a data area 816 of memory 814. More signaling information may be added to the transmission packets at packetizer 806. At least a first and a second P1 symbol are added to the transmission packet at packet merger 808. The completed packets are modulated in the assigned frequency band at modulator 810 and put out for transmission, for example to an antenna.

Controller/processor 812 controls the operation of the coder 804, packetizer 806, packet merger 808 and modulator 810. For example, controller/controller 812 defines the signaling parameters that are included in a first and a second group of signaling information. Controller/processor 812 may also define an initialization value for scrambler block 710 of P1 symbol generator 802. Controller may further define properties of the transmitted data, such as the bit rate, audio bandwidth, number of audio channels, audio codecs, video resolution, video frame rate, video codecs, and/or the like.

Apparatus 800 may further comprise memory 814 storing software for running apparatus 800. For example, software instructions for running the controller/processor 812 may be stored in a code area 818 of memory 814. Memory 814 may comprise volatile memory, for example random access memory (RAM), and non volatile memory, for example read only memory (ROM), FLASH memory, or the like. Memory 814 may comprise one or more memory components. Memory 814 may also be embedded with controller/processor 812. Software comprising data and instructions to run apparatus 800 may also be loaded into memory 814 from an external source. For example, software may be stored on an external memory like a memory stick comprising one or more FLASH memory components, a compact disc (CD), a digital versatile disc (DVD) 830, and/or the like. Software or software components for running apparatus 800 may also be loaded from a remote server, for example through the internet.

Figure 9:
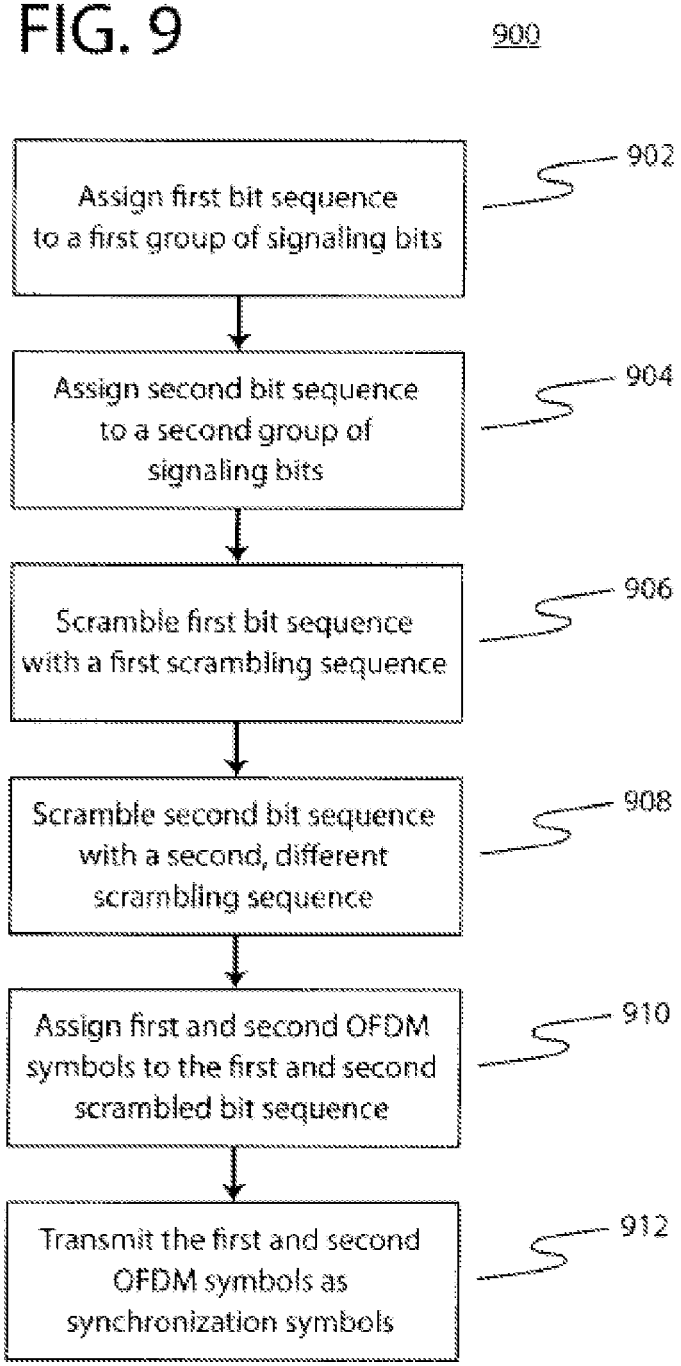
FIG. 9 is a flow diagram of a method for transmitting P1 symbols as synchronization symbols according to an example embodiment of the invention.

FIG. 9 is a flow diagram of a method 900 for transmitting P1 symbols as synchronization symbols according to an example embodiment of the invention. At step 902, a first bit sequence is assigned to a first group of signaling bits, for example a group comprising S1 and S2 signaling bits as described in relation to TABLES 1 to 3. At step 904, a second bit sequence is assigned to a second group of signaling bits. The second group of signaling bits may be a copy of the first group of signaling bits. In an alternative embodiment, the second group of signaling bits comprises signaling information different from the information carried in the first group of signaling bits.

At step 906, the first bit sequence is scrambled with a first scrambling sequence, and at step 908 the second bit sequence is scrambled with a second scrambling sequence different from the first scrambling sequence. The first and second scrambling sequences may be different parts of a longer random sequence, for example a PRBS. The parts of the longer random sequence may be overlapping. The parts may be parts of different longer random sequences.

At step 910, a first and a second OFDM symbol are assigned to the first and second scrambled bit sequence. At step 912, the first and second OFDM symbol are transmitted as synchronization symbols, for example synchronization symbols of a frame or a packet.

No special order is required for the steps the method of FIG. 9 related to the first group of signaling bits and for the blocks related to the second group of signaling bits. For example, the order may be changed so that first the first group of signaling bits is handled. Thus, a first bit sequence is assigned to the first group of signaling bits. Then, the first bit sequence is scrambled, and a first OFDM symbol is assigned to the first scrambled bit sequence. After that, handling of the second group of signaling bits is started.

Processing of the first bit sequence and the second bit sequence may also be performed in parallel. In an example embodiment, a first bit sequence is assigned to a first group of signaling bits. While the first bit sequence is scrambled with a first scrambling sequence, a second bit sequence is assigned to a group of signaling bits. While the first OFDM symbol is assigned to the first scrambled bit sequence, the second bit sequence is scrambled. While the first OFDM symbol is transmitted, a second OFDM symbol is assigned to the second scrambled bit sequence. Parallel execution may continue in the same or in a similar way for a third and a fourth group of signaling bits. In an example embodiment, parallel execution may be performed by the P1 symbol generator 700 of FIG. 7, as data is shifted through the blocks of the P1 symbol generator.

Figure 10:
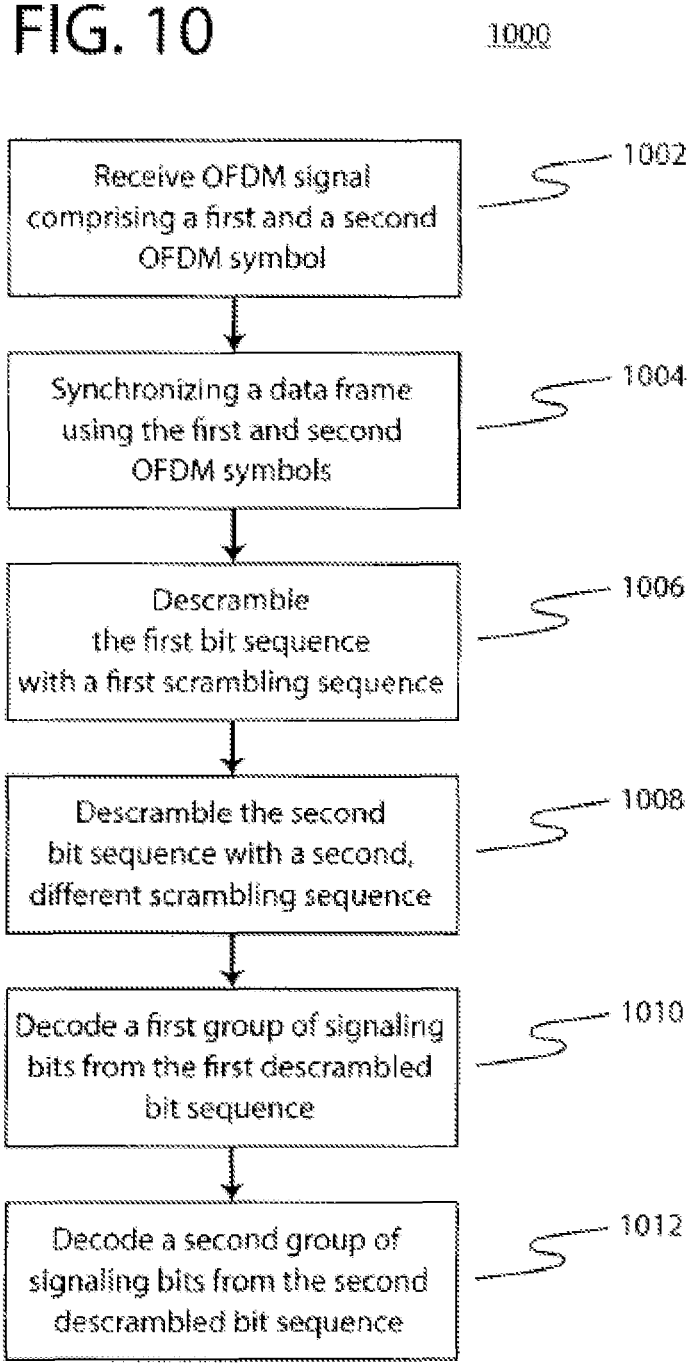
FIG. 10 is a flow diagram of a method for receiving a frame or packet comprising P1 symbols as synchronization symbols according to an example embodiment of the invention.

FIG. 10 is a flow diagram of a method 1000 for receiving a frame or packet comprising P1 symbols as synchronization symbols according to an example embodiment of the invention. At step 1002 an OFDM signal is received which comprises a first and a second OFDM symbol. The first and second OFDM symbol are used for synchronization of a data frame carried in the OFDM signal at step 1004. The bit sequences of the first and second OFDM symbols are descrambled using a first and second scrambling sequence at steps 1006 and 1008, respectively. The second scrambling sequence is different from the first scrambling sequence. The scrambling sequences at the receiver correspond to the scrambling sequences at the transmitter described in relation to FIG. 9. In an example embodiment, the scrambling sequences at the receiver are the same scrambling sequences as at the transmitter.

At step 1010, a first group of signaling bits is decoded from the first descrambled bit sequence. At step 1012, a second group of signaling bits is decoded from the second descrambled bit sequence. In an example embodiment, the second group of signaling bits may carry the same signaling information as the first group of signaling bits. In an example embodiment, the information carried in the second group of signaling bits is different from the information of the first group signaling bits.

In an example embodiment, a third and/or a fourth OFDM symbol are received and used for synchronization. The bit sequences of the third and fourth OFDM symbol are descrambled using a third and fourth scrambling sequence. The third and fourth scrambling sequences are different from the first and second scrambling sequence. In an example embodiment, the first to fourth scrambling sequences are continuous parts of a random sequence, for example of a PRBS generated by a PRBS generator at the receiver or stored in memory at the receiver. A third and fourth group of signaling bits are decoded from the third and fourth descrambled bit sequences. In an example embodiment, the information carried in the third and fourth groups of signaling bits is different from the information of the first and second groups of signaling bits.

Figure 11:
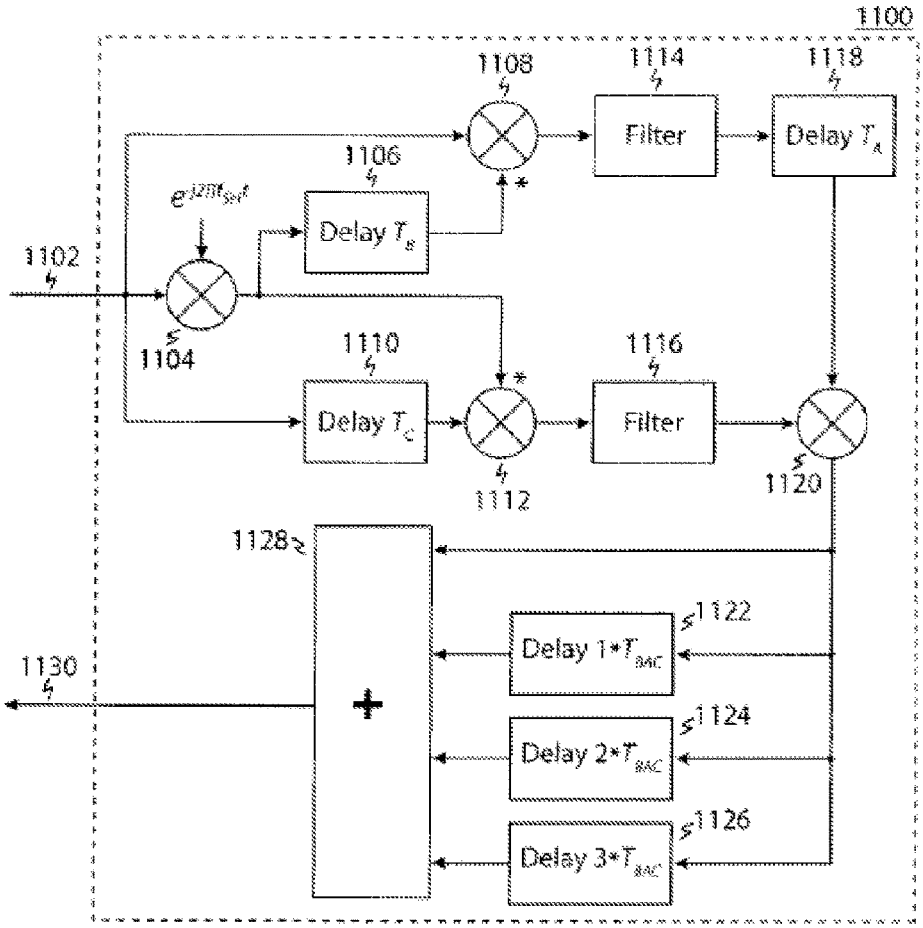
FIG. 11 shows an example embodiment of a timing synchronization unit for a receiver for the synchronization of up to four orthogonal frequency division multiplexing (OFDM) symbols.

FIG. 11 shows an example embodiment of a timing synchronization unit 1100 for a receiver for the synchronization of up to four OFDM symbols. The up to four OFDM symbols may have a structure as described in relation to FIG. 3. A base band signal is received at an input 1102 and frequency shifted at 1104 with a frequency $f_{SH}$, which denotes the frequency shift between parts B 314/C 316 and part A 302 of the P1 symbol 202. In the upper branch, the frequency shifted signal is delayed by a time $T_B$ at $T_B$ delay block 1106, conjugated, and multiplied by the input signal. Thus, a correlation of parts B 314 and A1 304 may be detected, for example after a running average filter 1114. In the lower branch, the input signal is delayed by a time $T_C$ at $T_C$ delay block 1110 and multiplied by the frequency shifted and conjugated input signal. Thus, a correlation of parts A2 306 and C 316 may be detected after a running average filter 1116. In an example embodiment, the correlation between parts B and A1 may occur a time $T_A$ before the correlation of A2 and C. Therefore, the signal from multiplier 1108 and filter 1114 is delayed at $T_A$ delay block 1118 by $T_A$. In an example embodiment, the signal from delay block 1118 and filter 1116 is multiplied at a multiplier 1120.

For an undisturbed signal, multiplier 1120 may output a signal peak for every P1 symbol. As P1 symbols are transmitted in direct succession, a signal peak may occur for every P1 symbol at intervals $T_{BAC}$, the time of the P1 symbol 202 of FIGS. 2 and 3. Thus, the signal from multiplier 1120 is delayed at $T_{BAC}$ delay block 1122 for $T_{BAC}$, at $2T_{BAC}$ delay block 1124 for $2*T_{BAC}$ and at $3T_{BAC}$ delay block 1126 for $3*T_{BAC}$. The undelayed signal and the delayed signals are summed at summation block 1128. A maximum peak of output 1130 may serve as a synchronization signal for the timing synchronization of a data frame or packet, for example of data frame 542 of FIG. 5 or data frame 642 of FIG. 6.

In an example embodiment, the signal from multiplier 1120 may be divided into multiple paths by using a switch that changes its position after each $T_{BAC}$. The switch lets the signal from multiplier 1120 pass to one path at a time, for example to either a path containing one of the $T_{BAC}$ delay block 1122, $2T_{BAC}$ delay block 1124, $3T_{BAC}$ delay block 1126 or the path to summation block 1128. The separated signals are delayed at the three delay blocks 1122, 1124, and 1126 for $T_{BAC}$, $2*T_{BAC}$ and $3*T_{BAC}$, respectively, and summed at summation block 1128 as described above. By using a switch to select only one path at a time for the signal, multiple peaks or side peaks of output signal 1130 may be avoided.

Synchronization unit 1100 may also work for less than four P1 symbols. However, the synchronization signal at output 1130 may have a lower peak as for four P1 symbols.

Summing the correlation peaks of up to four P1 symbols at summation block 1128 may increase the level of the correlation peak relative to a noise level of the signal, as four P1 symbols may carry 4 times the energy of a single P1 symbol. A detection threshold may be selected accordingly. Thus, synchronization of more than one P1 symbol may be more robust or reliable. As the summation process at block 1128 is a linear process, a fractional frequency offset may still be detected from output signal 1130 for frequency synchronization. The accuracy of a fractional frequency offset detection may be increased, as the output signal is an average of four measurements with respect to the fractional frequency offset detection.

In an example embodiment, the number of delay blocks 1122, 1124, 1126 may be adopted to the number of P1 symbols. For every additional P1 symbol, one delay block is needed. Thus, for 2 P1 symbols, delay block 1122 is needed, while delay blocks 1124 and 1126 may be removed from the synchronization unit. For 3 P1 symbols, delay block 1122 and 1124 are needed, while delay block 1126 may be removed. For 5 P1 symbols, one more delay block with a delay of $4*T_{BAC}$ may be added.

Figure 12:
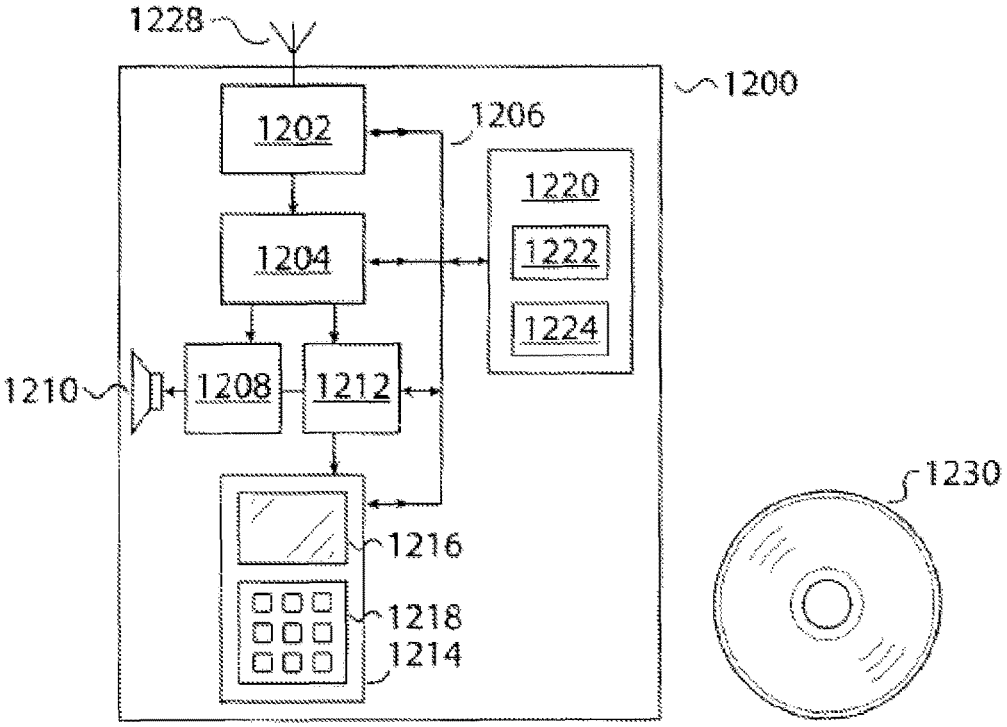
FIG. 12 shows an example embodiment of an apparatus configured to receive a media stream.

FIG. 12 shows an example embodiment of an apparatus 1200 configured to receive a broadcast transmission, for example apparatus 114, 116 of FIG. 1. Apparatus 1200 may be a mobile apparatus, for example a mobile phone, or a stationary apparatus, for example a television set or a multimedia center. Apparatus 1200 comprises a receiver 1202 configured to receive a transmission of digital multimedia transmission comprising a media stream, for example a transmission according to the DVB-T2 system or the DVB-NGH system. In an example embodiment, the transmission may be received through antenna 1228. In another example embodiment, the transmission may be received through a cable connection. Receiver 1202 may comprise a synchronization unit 1100 as described in relation to FIG. 11. An incoming frame or packet of the media stream is forwarded to a controller or processor 1204. Processor 1204 may be a digital signal processor (DSP), a microcontroller unit (MCU), a reduced instruction set controller (RISC), or any other kind of processor with sufficient processing capabilities. Processor 1204 may perform a packet decapsulation and extraction of signaling information. Thus, processor 1204 may extract lower layer signaling information comprised in multiple P1 symbols of the data frame or packet, and/or higher layer signaling information, for example signaling information comprised in at least one P2 symbol, in an electronic service guide (ESG) and/or a session description file. Processor 1204 may further receive a synchronization signal from the synchronization unit of receiver 1202. Based at least in part on the synchronization signal, processor 1204 may determine timing information for receiving the data frame or packet. Based at least in part on the signaling information comprised in the multiple P1 symbols, processor 1204 may determine whether to receive the complete data frame or packet, or whether to stop reception of the data frame or packet.

Apparatus 1200 may comprise one or more memory blocks 1220. Memory 1220 may comprise volatile memory 1222, for example random access memory (RAM). Volatile memory 1222 may be used to store data received from receiver 1202, for example data of a media stream at various processing and filtering stages, signaling data from the incoming frame or packet, configuration data for apparatus 1200, and/or the like. Processor 1204 may communicate with memory blocks 1220 through a bidirectional bus 1206 in order to read and store data and/or instructions.

Audio data from the data stream may be put out from processor 1204 to audio decoder 1208. Audio decoder 1208 decodes the audio data and converts the data to an analog audio signal. Analog audio signal may be played back on loudspeaker 1210. In an example embodiment, the analog audio signal is played back on an audio headset.

Video data may be forwarded from processor 1204 to video decoder 1212 which prepares the video data for play back on a display 1216 of user interface 1214. User interface 1214 may further comprise a keyboard 1218 for entering user data. User data may comprise a user preference, for example a user preference for viewing a media stream at a certain video and/or audio quality, resolution, frame rate, and the like. A user preference may be used by processor 1204 to determine which audio and video data to receive and/or decode from the media stream.

Memory 1220 may also comprise non volatile memory 1224, for example read only memory (ROM), FLASH memory, or the like. Non-volatile memory 1224 may be used to store software instructions for processor 1204, for example instructions to perform the process 1000 of FIG. 10. At least a part of memory 1220 may also be embedded with processor 1204. Software comprising data and instructions to run apparatus 1200 may also be loaded into memory 1220 from an external source. For example, software may be stored on an external memory like a memory stick comprising one or more FLASH memory components, a compact disc (CD), a digital versatile disc (DVD) 1230, or the like. Software or software components for running apparatus 1200 may also be loaded from a remote server, for example through the internet.

Without in any way limiting the scope, interpretation, or application of the claims appearing below, a technical effect of one or more of the example embodiments disclosed herein is to make synchronization of a frame or packet more robust or reliable. Another technical effect of one or more of the example embodiments disclosed herein is a higher robustness against multipath propagation in single frequency networks due to the different scrambling sequences. Another technical effect of one or more of the example embodiments disclosed herein is a higher signaling capacity of the signaling in the multiple P1 symbols.

Embodiments of the present invention may be implemented in software, hardware, application logic or a combination of software, hardware and application logic. The software, application logic and/or hardware may reside on an apparatus or an accessory to the apparatus. For example, the receiver may reside on a mobile TV accessory connected to a mobile phone. If desired, part of the software, application logic and/or hardware may reside on an apparatus, part of the software, application logic and/or hardware may reside on an accessory. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8 and another example of a computer described and depicted in FIG. 12. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:

assigning a first [bit] sequence of a first length to [a first group of] signaling [bits] *information*;

generating a first scrambling sequence and scrambling the first [bit] sequence with the first scrambling sequence;

assigning a first orthogonal frequency division multiplexing symbol to the first [scrambled bit] sequence *scrambled by the first scrambling sequence*; and transmitting the first orthogonal frequency division multiplexing symbol as *a* synchronization symbol of a data frame, wherein the first [group of signaling bits] *orthogonal frequency division multiplexing symbol* indicates whether a next symbol comprises a second orthogonal frequency division multiplexing symbol as an additional synchronization symbol, wherein the second orthogonal frequency division multiplexing symbol [comprises] *is assigned to* a second [bit] sequence scrambled by a second scrambling sequence [and], *wherein the second sequence is* assigned to [a second group of] *the* signaling [bits] *information*, wherein the first and *the* second [bit] sequences have the same length, *and* wherein the first scrambling sequence [is generated by a pseudo random binary sequence generator using a first initialization value, and wherein] *and* the second scrambling sequence [is generated by the] *are different parts of a* pseudorandom binary sequence [generator using a second initialization value] *having a repetition length greater than each length of the first and the second sequences*.

2. The method [according to] *of* claim 1, wherein the second [group of signaling bits] *sequence* comprises information different from the first [group of signaling bits] *sequence*.

3. The method [according to] *of* claim 1, wherein the data frame is a data frame of a digital video broadcast.

4. A method comprising:

receiving an orthogonal frequency division multiplexing signal comprising a first orthogonal frequency division multiplexing symbol;

synchronizing a data frame based at least in part on the first orthogonal frequency division multiplexing symbol, wherein the first orthogonal frequency division multiplexing symbol corresponds to a first scrambled [bit] sequence;

*generating a first sequence by* descrambling the first scrambled [bit] sequence with a first scrambling sequence; and decoding [a first group of] signaling [bits] *information* from the first [descrambled bit] sequence, wherein the first [group of signaling bits] *orthogonal frequency division multiplexing symbol* indicates whether a next symbol comprises a second orthogonal frequency division multiplexing symbol as an additional synchronization symbol;

determining from the first [group of signaling bits] *orthogonal frequency division multiplexing symbol* whether the second orthogonal frequency division multiplexing [synchronization] symbol is present, and in response to determining that the second orthogonal frequency division multiplexing [synchronization] symbol is present:

receiving the second orthogonal frequency division multiplexing [synchronization] symbol corresponding to a second scrambled [bit] sequence;

*generating a second sequence by* descrambling the second scrambled [bit] sequence with a second scrambling sequence; and decoding [a second group of] *the* signaling [bits] *information* from the second [descrambled bit] sequence, wherein the first and *the* second [bit] sequences have the same length, *and* wherein the first scrambling sequence [is generated by a pseudorandom binary sequence generator using a first initialization value, and wherein] *and* the second scrambling sequence [is generated by the] *are different parts of a* pseudorandom binary sequence [generator using a second initialization value] *having a repetition length greater than each length of the first and the second sequences*.

5. The method [according to] *of* claim 4, wherein the second [group of signaling bits] *sequence* comprises information different from the first [group of signaling bits] *sequence*.

6. An apparatus, comprising:

at least one hardware processor; and at least one memory including computer program code, the at least one memory and the computer program code configured to, with the at least one hardware processor, cause the apparatus to perform at least the following:

assign a first [bit] sequence of a first length to [a first group of] signaling [bits] *information*;

generate a first scrambling sequence and scramble the first [bit] sequence with the first scrambling sequence;

assign a first orthogonal frequency division multiplexing symbol to the first [scrambled bit] sequence *scrambled by the first scrambling sequence*; and transmit the first orthogonal frequency division multiplexing symbol as *a* synchronization symbol of a data frame, wherein the first [group of signaling bits] *orthogonal frequency division multiplexing symbol* indicates whether a next symbol comprises a second orthogonal frequency division multiplexing symbol as an additional synchronization symbol, wherein the second orthogonal frequency division multiplexing symbol [comprises] *is assigned to* a second [bit] sequence scrambled by a second scrambling sequence [and], *wherein the second sequence is* assigned to [a second group of] *the* signaling [bits] *information*, wherein the first and *the* second [bit] sequences have the same length, *and* wherein the first scrambling sequence [is generated by a pseudo random binary sequence generator using a first initialization value, and wherein] *and* the second scrambling sequence [is generated by the] *are different parts of a* pseudorandom binary sequence [generator using a second initialization value] *having a repetition length greater than each length of the first and the second sequences*.

7. A non-transitory [computer program product comprising a] computer-readable medium [bearing computer program code embodied therein for use with] *encoded with instructions that when executed by* a computer, [the computer program code comprising] *causes an apparatus to*:

[code for assigning] *assign* a first bit sequence of a first length to a first group of signaling bits;

[code for generating] *generate* a first scrambling sequence and [code for scrambling] *scramble* the first bit sequence with the first scrambling sequence;

[code for assigning] *assign* a first orthogonal frequency division multiplexing symbol to the first scrambled bit sequence; and

[code for transmitting] *transmit* the first orthogonal frequency division multiplexing [symbols] *symbol* as *a* synchronization symbol of a data frame, wherein the first group of signaling bits indicates whether a next symbol comprises a second orthogonal frequency division multiplexing symbol as an additional synchronization symbol, wherein the second orthogonal frequency division multiplexing symbol comprises a second bit sequence scrambled by a second scrambling sequence and assigned to a second group of signaling bits, wherein the first and second bit sequences have the same length, wherein the first scrambling sequence is generated by a [pseudo random] *pseudorandom* binary sequence generator using a first initialization value, and wherein the second scrambling sequence is generated by the pseudorandom binary sequence generator using a second initialization value.

8. A non-transitory computer-readable medium encoded with instructions that, when executed by a computer, [perform] *cause an apparatus to*:

[assigning] *assign* a first [bit] sequence of a first length to [a first group of] signaling [bits] *information*;

[generating] *generate* a first scrambling sequence and [scrambling] *scramble* the first [bit] sequence with the first scrambling sequence;

[assigning] *assign* a first orthogonal frequency division multiplexing symbol to the first [scrambled bit] sequence *scrambled by the first scrambling sequence*; and

[transmitting] *transmit* the first [and second] orthogonal [frequency-division] *frequency division* multiplexing [symbols] *symbol* as *a* synchronization [symbols] *symbol* of a data frame, wherein the first [group of signaling bits] *orthogonal frequency division multiplexing symbol* indicates whether a next symbol comprises a second orthogonal frequency division multiplexing symbol as an additional synchronization symbol, wherein the second orthogonal frequency division multiplexing symbol comprises a second [bit] sequence scrambled by a second scrambling sequence [and], *wherein the second sequence is* assigned to [a second group of] *the* signaling [bits] *information*, wherein the first and *the* second [bit] sequences have the same length, *and* wherein the first scrambling sequence [is generated by a pseudo random binary sequence generator using a first initialization value, and wherein] *and* the second scrambling sequence [is generated by the] *are different parts of a* pseudorandom binary sequence [generator using a second initialization value] *having a repetition length greater than each length of the first and the second sequences*.

9. An apparatus, comprising:

at least one hardware processor; and at least one memory including computer program code, the at least one memory and the computer program code configured to, with the at least one hardware processor, cause the apparatus to perform at least the following:

receive an orthogonal frequency-division multiplexing signal comprising a first orthogonal [frequency-division] *frequency division* multiplexing symbol;

synchronize a data frame based at least in part on the first orthogonal frequency division multiplexing symbol, wherein the first orthogonal frequency division multiplexing symbol corresponds to a first scrambled [bit] sequence;

[descramble] *generate a first sequence by descrambling* the first scrambled [bit] sequence with a first scrambling sequence; [and]

decode [a first group of] signaling [bits] *information* from the first [descrambled bit] sequence, wherein the first [group of signaling bits] *orthogonal frequency division multiplexing symbol* indicates whether a next symbol comprises a second orthogonal frequency division multiplexing symbol as an additional synchronization symbol;

determine from the first [group of signaling bits] *orthogonal frequency division multiplexing symbol* whether the second orthogonal frequency division multiplexing [synchronization] symbol is present, and in response to [determining] *a determination* that the second orthogonal frequency division multiplexing [synchronization] symbol is present:

receive the second orthogonal frequency division multiplexing [synchronization] symbol corresponding to a second scrambled [bit] sequence;

[descramble] *generate a second sequence by descrambling* the second scrambled [bit] sequence with a second scrambling sequence; and decode [a second group of] *the* signaling [bits] *information* from the second [descrambled bit] sequence, wherein the first and *the* second [bit] sequences have the same length, *and* wherein the first scrambling sequence [is generated by a pseudorandom binary sequence generator using a first initialization value, and wherein] *and* the second scrambling sequence [is generated by the] *are different parts of a* pseudorandom binary sequence [generator using a second initialization value] *having a repetition length greater than each length of the first and the second sequences*.

10. A [computer program product comprising a] non-transitory computer-readable medium [bearing computer program code embodied therein for use with a computer, the computer program code comprising] *encoded with instructions that when executed by a computer, cause an apparatus to*:

[code for receiving] *receive* an orthogonal frequency division multiplexing signal comprising a first orthogonal frequency division multiplexing symbol;

[code for synchronizing] *synchronize* a data frame based at least in part on the first orthogonal frequency division multiplexing [symbols] *symbol*, wherein the first orthogonal frequency division multiplexing symbol corresponds to a first scrambled [bit] sequence;

[code for] *generate a first sequence by* descrambling the first scrambled [bit] sequence with a first scrambling sequence; and

[code for decoding a first group of] *decode* signaling [bits] *information* from the first [descrambled bit] sequence [and], wherein the first [group of signaling bits] *orthogonal frequency division multiplexing symbol* indicates whether a next symbol comprises a second orthogonal frequency division multiplexing symbol as an additional synchronization symbol*;*

[code for determining] *determine* from the first [group of signaling bits] *orthogonal frequency division multiplexing symbol* whether the second orthogonal frequency division multiplexing [synchronization] symbol is present, and in response to [determining] *a determination* that the second orthogonal frequency division multiplexing [synchronization] symbol is present:

[code for receiving] *receive* the second orthogonal frequency division multiplexing [synchronization] symbol corresponding to a second scrambled [bit] sequence;

[code for] *generate a second sequence by* descrambling the second scrambled [bit] sequence with a second scrambling sequence; and

[code for decoding a second group of] *decode the* signaling [bits] *information* from the second [descrambled bit] sequence, wherein the first and *the* second [bit] sequences have the same length, *and* wherein the first scrambling sequence [is generated by a pseudorandom binary sequence generator using a first initialization value, and wherein] *and* the second scrambling sequence [is generated by the] *are different parts of a* pseudorandom binary sequence [generator using a second initialization value] *having a repetition length greater than each length of the first and the second sequences.*

*11. The method of claim 1, wherein the first scrambling sequence is generated by a pseudorandom binary sequence generator using a first initialization value, and wherein the second scrambling sequence is generated by the pseudorandom binary sequence generator using a second initialization value.*

*12. The method of claim 1, wherein the second sequence is identical to the first sequence.*

*13. The method of claim 4, wherein the first scrambling sequence is generated by a pseudorandom binary sequence generator using a first initialization value, and wherein the second scrambling sequence is generated by the pseudorandom binary sequence generator using a second initialization value.*

*14. The method of claim 4, wherein the second sequence is identical to the first sequence.*

*15. The method to claim 4, wherein the data frame is a data frame of a digital video broadcast.*

*16. The apparatus of claim 6, wherein the first scrambling sequence is generated by a pseudorandom binary sequence generator using a first initialization value, and wherein the second scrambling sequence is generated by the pseudorandom binary sequence generator using a second initialization value.*

*17. The apparatus of claim 6, wherein the second sequence is identical to the first sequence.*

*18. The apparatus to claim 6, wherein the data frame is a data frame of a digital video broadcast.*

*19. The apparatus of claim 9, wherein the first scrambling sequence is generated by a pseudorandom binary sequence generator using a first initialization value, and wherein the second scrambling sequence is generated by the pseudorandom binary sequence generator using a second initialization value.*

*20. The apparatus of claim 9, wherein the second sequence is identical to the first sequence.*

*21. The apparatus to claim 9, wherein the data frame is a data frame of a digital video broadcast.*

* * * * *